United States Patent Office 3,006,917
Patented Oct. 31, 1961

3,006,917
2,2-BIS-[p'-HYDROXY-PHENYL]-3-OXO - DIHYDRO-1,4-BENZOXAZINES AND THEIR O-ACYL AND O-ALKYL DERIVATIVES
Ernst Seeger, Biberach on the Riss, Germany, assignor to Dr. Karl Thomae G.m.b.H., Biberach on the Riss, Germany, a corporation of Germany
No Drawing. Filed Jan. 11, 1960, Ser. No. 1,452
Claims priority, application Germany Oct. 16, 1959
5 Claims. (Cl. 260—244)

This invention relates to certain pharmacologically active 2,2-bis-substituted 3-oxo-dihydro-1,4-benzoxazines and various methods of preparing such compounds.

More particularly, this invention relates to 2,2-bis-[p' - substituted - phenyl] - 3 - oxo - dihydro - 1,4-benzoxazines having the general structural formula

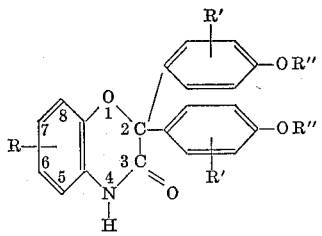

wherein
R is hydrogen or lower alkyl
R' is hydrogen, lower alkyl or lower alkoxy, and
R'' is hydrogen, acyl or lower alkyl.

The compounds of the invention having the general structural formula I above may be prepared by several different methods, as follows:

METHOD I

By reacting a 2,2-dihalo-3-oxo-dihydro-1,4-benzoxazine having the general structural formula

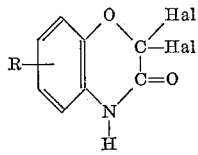

wherein R has the same meanings as defined in connection with Formula I and Hal is halogen, with a phenol compound having the general structural formula

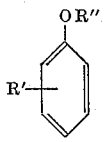

wherein R' is an ortho- or meta-substituent having the same meanings as defined in connection with Formula I and R'' has the same meanings as defined in connection with Formula I. If it is desired to prepare compounds of the formula I wherein R'' is an alkyl or acyl radical and the reactant of the Formula III is a phenol compound wherein R'' is hydrogen, the alkylation or acylation of one or both of the hydroxyl groups on the phenyl rings may be accomplished in known fashion during or after the reaction between compound II and compound III.

At least two mols of phenol compound III are reacted with each mol of the dihalo compound II. However, it is advantageous to use a larger excess of phenol compound III. The reaction is carried out at moderately elevated temperatures, preferably at temperatures between 30 and 150° C., and, if desired, in the presence of an inert organic solvent or diluent such as benzene, toluene, xylene, nitrobenzene, dichlorobenzene, carbon tetrachloride etc.

If desired, the reaction between compound II and compound III may also be performed in the presence of a small amount (0.01 to 5% by weight of the total weight of reactants) of an acid metal catalyst, such as zinc chloride, aluminum chloride or iron chloride, whereby a shortening of the reaction period is achieved. The reaction may also be carried out in an atmosphere of an inert gas, such as nitrogen or carbon dioxide, if it is deemed necessary and advantageous.

The 2,2-dihalo-3-oxo-dihydro-1,4-benzoxazines of the Formula II used in this reaction may be readily prepared, for example, by subjecting a 2,3-dioxo-dihydro-1,4-benzoxazine of the general formula

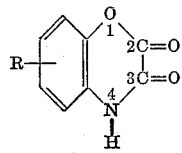

wherein R has the meanings previously defined, i.e. hydrogen or lower alkyl, to a reaction with a compound which will effect an exchange of the oxygen atom in the 2-position for two halogen atoms. Halides of phosphorus are particularly suitable for this purpose. For instance, by reaction of phosphorus pentachloride with 2,3-dioxo-dihydro-1,4-benzoxazine and recrystallization of the reaction product from carbon tetrachloride or benzene, 2,2-dichloro-3-oxo-dihydro-1,4-benzoxazine is obtained in the form of a colorless crystalline substance having a melting point of 180 to 181° C. Similarly, the raction of 2,3-dioxo-dihydro-6-methyl-1,4-benzoxazine with phosphorus pentachloride yields 2,2-dichloro-3-oxo-6-methyldihydro-1,4-benzoxazine in the form of a colorless substance having a melting point of 202° C.

The reaction of phenol compound III with the 2,2-dihalo-3-oxo-dihydro-1,4-benzoxazine II may be effected in the same medium in which compound II was formed. Thus, compound II produced, for example, by reaction of a phosphorus halide with 2,3-dioxo-dihydro-1,4-benzoxazine (IV) in an inert solvent does not need to be isolated from the reaction mixture; instead, the phenol compound III may be added directly to this reaction mixture, once the reaction between the phosphorus halide and compound IV has gone to completion, in order to effect the formation of the 2,2-bis-[p'-hydroxy-phenyl]-3-oxo-dihydro-1,4-benzoxazine of the formula.

METHOD II (a) Compounds of the Formula I may also be prepared by reacting an α,α-bis-(p-O-substituted-phenyl)-glycollic acid of the general formula

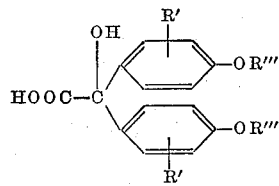

wherein R' has the meanings previously defined in connection with Formula I and R''' is a grouping which may subsequently be exchanged for hydrogen, such as an alkyl or aralkyl grouping, with an o-amino-phenol of the formula

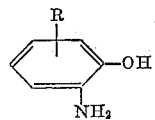

wherein R has the meanings previously defined, i.e. hydrogen or lower alkyl.

This reaction produces 2,2-bis-(p-O-substituted-phenyl)-3-oxo-dihydro-1,4-benzoxazines of the general formula

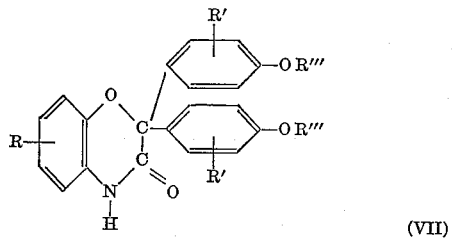

(VII)

wherein R, R' and R''' have the meanings previously defined, and is carried out at elevated temperatures, preferably at temperatures between 150 and 220° C. It may also be performed in an inert solvent; for example, in a hydrocarbon such as cumene or tetralin, or in a chlorinated hydrocarbon such as dichlorobenzene. Advantageously, the reaction is also carried out in the presence of a catalyst having a dehydrating effect, such as arylsulfonic acids, zinc chloride or aluminum chloride.

In place of the free α,α-bis-(p-O-substituted-phenyl)-glycollic acids (V) their reactive esters, such as their lower alkyl esters, may be used, but the yields of compounds VII are somewhat less favorable under these circumstances.

(b) Compounds having the general Formula VII may also be obtained by first reaction an α,α-bis(p-O-substituted-phenyl)-glycollic acid of the Formula V with, for example, phosphorus pentachloride or thionyl chloride to form the corresponding α,α-bis-(p-O-substituted-phenyl)-α-halo-acetic acid halide of the formula

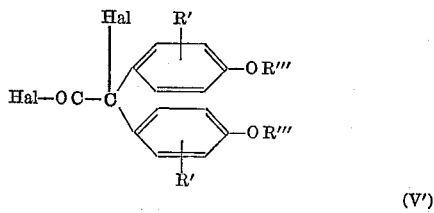

(V')

wherein R' and R''' have the meanings previously defined and Hal is a halogen, and then reacting compound V' with an o-aminophenol of the Formula VI to form an α,α-bis-(p-O-substituted-phenyl)-glycollic acid-o-hydroxy-anilide of the formula

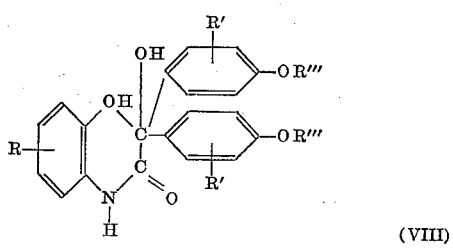

(VIII)

wherein R, R' and R''' have the meanings previously defined. Compounds VIII are then transformed into compounds VII by a cyclizing reaction with a dehydrating condensation agent, as explained in greater detail below.

The α,α-bis-(p-O-substituted phenyl)-α-halo-acetic acid halides (V') required for the transformation of the o-aminophenols (VI) into the α,α-bis-(p-O-substituted-phenyl)-glycollic acid-o-hydroxy-anilides (V) do not need to be used in the pure state. Instead, the raw halides V' may be used after removing an excess of one or the other of the reactants, any side products formed by the reaction between compound V and the halogenating agent, such as phosphorus oxychloride, and, if desired, any inert solvent which may be present in the reaction mass.

The reaction between compounds V' and o-aminophenols VI is advantageously carried out in an inert solvent, such as acetone, ether, benzene and the like, and in the presence of an organic or inorganic acid-neutralizing agent, such as pyridine, sodium bicarbonate or an excess of the o-aminophenol VI. The reaction is most conveniently performed at room temperature, following by slight heating of the reaction mixture, if desired. The compounds VIII formed by this reaction may be readily isolated from the reaction mixture in the pure form by recrystallization, for example from dilute aqueous ethanol.

(c) Compounds having the general structural Formula VII may also be prepared by reacting a 2,3-dioxo-dihydro-1,4-benzoxazine of the formula

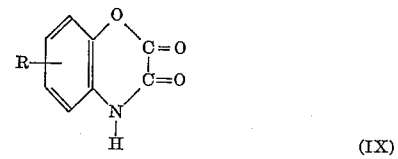

(IX)

wherein R has the meanings previously defined, i.e. hydrogen or lower alkyl, or an (o-hydroxy-phenyl)-oxamic acid ester of the formula

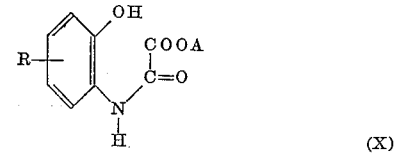

(X)

wherein R has the meanings previously defined and —COOA is a reactive ester group, preferably an alkyl ester group, with an organo-magnesium halide having the general structural formula

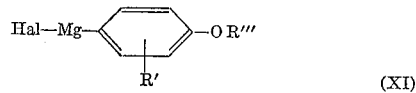

(XI)

wherein Hal is a halogen and R' and R''' have the meanings previously defined, to form an α,α-bis-(p-O-substituted-phenyl)-glycollic acid-o-hydroxy-anilide having the structural Formula VIII above, which is then transformed into the corresponding 2,2-bis-(p-O-substituted-phenyl)-3-oxo-dihydro-1,4-benzoxazine of the Formula VII by a ring closure reaction with a dehydrating condensation agent, as explained in greater detail below.

The reaction of compounds IX or X with the organomagnesium halides XI is carried out under conditions which are customarily applied to Grignard reactions. Suitable solvents or diluents for this Grignard reaction are ether, benzene, tetrahydrofuran and the like or mixtures thereof. The reaction may be carried out at room temperature or moderately elevated temperatures.

The (o-hydroxy-phenyl)-oxamic acid esters of the Formula X above may readily be prepared by reacting an oxalic acid alkyl ester chloride with an o-aminophenol or an alkyl-substituted o-amino-phenol.

As previously pointed out, the compounds of the Formula VIII may be transformed into compounds of the Formula VII by a ring closure reaction with the aid of cyclizing agents. Suitable cyclizing agents for this purpose are dehydrating condensation agents, such as concentrated or aqueous sulfuric acid, phosphorus pentoxide, zinc chloride, aluminum chloride and the like. This ring closure reaction may be carried out within a wide temperature range, depending upon the nature of the cyclizing agent. For example, while the ring closure reaction is advantageously carried out in the cold and in the presence of an inert solvent, such as glacial acetic acid, if the cyclizing agent is sulfuric acid, it is preferable to carry it out at moderately elevated temperatures and without a solvent if the cyclizing agent is phosphorus pentoxide, zinc chloride or aluminum chloride.

However, the ring closure may also be effected with the aid of cyclizing agents which, as an intermediate step, replace the hydroxyl group in the α-position of compounds VIII by a halogen atom and upon further reaction with the α-halo intermediate effect the ring closure to yield compounds of the Formula VII. Examples of such cyclizing agents are thionyl chloride and phosphorus oxychloride. Most advantageously, this type of ring closure reaction is carried out in an inert solvent at moderately elevated temperature; for example, if carbon tetrachloride is used as the solvent, it is preferably carried out at the boiling point of the solvent.

Finally, the ring closure may also be effected by heating compounds VIII in an inert solvent having a relatively high boiling point, such as dichlorobenzene, tetralin, cumene and the like, to a temperature preferably between 130 and 220° C. in the presence of a small amount of a catalyst which accelerates the splitting off of water, such as p-toluene-sulfonic acid, benzene sulfonic acid, naphthalene sulfonic acid or their halides.

If desired, the compounds of the Formula VII obtained in this manner, that is by method IIa, b and c, may readily be converted into compounds of the Formula I in accordance with methods which are well-known in the chemical art. For instance, if it is desired to prepare a compound of the Formula I wherein R″ is hydrogen, the radical R‴ in compound VII may be split off and replaced with hydrogen by known methods. Thus, if methods IIa, b or c yield a compound of the Formula VII wherein R‴ is an alkyl radical, i.e. a 2,2-bis-(p-alkoxy-phenyl)-3-oxo-dihydro-1,4-benzoxazine, the alkoxy group may readily be transformed into a hydroxyl group by heating compound VII in the presence of an agent customarily used for cleaving ether linkages, such as with pyridine hydrochloride; similarly, if R‴ is an aralkyl group, particularly a benzyl group, it may readily be split off and replaced by hydrogen in customary fashion.

If it is desired to prepare compounds of the Formula I wherein R″ is an alkyl or acyl radical, the corresponding hydroxyl compound, i.e. the compound wherein R″ is hydrogen, may be alkylated or acylated by customary methods. However, if R″ in Formula I is to be an alkyl radical it is preferred to use those α,α-bis-(p-O-substituted-phenyl)-glycollic acid compounds (V and V′) or those organomagnesium halides (XI) wherein R″ is already the desired alkyl radical in methods IIa, b and c.

The following examples will further illustrate the present invention and enable others to understand it more completely. It will be understood, however, that the invention is not limited to these specific illustrative examples.

EXAMPLE 1

*Preparation of compounds II used as starting materials in method I*

A suspension of 33 gm. 2,3-dioxo-dihydro-1,4-benzoxazine in 200 cc. anhydrous benzene was admixed with 46 gm. phosphorus pentachloride at room temperature while constantly stirring and excluding moisture. The resulting mixture was then stirred for 1 hour at room temperature, for 2 hours at 50° C. and for a short time at 80° C. until a clear solution was formed. The solution was filtered while hot and the filtrate was allowed to cool, whereupon a crystalline substance separated out. Recrystallized from carbon tetrachloride, it had a melting point of 180 to 181° C. and was identified as 2,2-dichloro-3-oxo-dihydro-1,4-benzoxazine of the formula

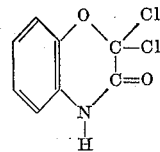

By following the above procedure, but using 2,3-dioxo-dihydro-6-methyl-1,4-benzoxazine instead of 2,3-dioxo-dihydro-1,4-benzoxazine, the reaction product recovered was 2,2-dichloro-3-oxo-dihydro-6-methyl-1,4-benzoxazine having the structural formula

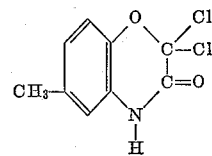

and a melting point of 202° C.

EXAMPLE 2

*Preparation of compounds having structural Formula I*

A mixture of 19 gm. 2,2-dichloro-3-oxo-dihydro-1,4-benzoxazine and 52 gm. phenol was placed into a round-bottom flask and heated to 70° C. on a water bath, whereby the reaction mixture became liquid and hydrogen chloride gas escaped. The liquid mass solidified after a short period of time. In order to cause the reaction to go to completion the mass was heated for an additional two hours at 60 to 70° C. Thereafter, the excess phenol was driven off by steam distillation and the residue was recrystallized from dilute ethanol. 21 gm. of 2,2-bis-[4′-hydroxy-phenyl]-3-oxo-dihydro-1,4-benzoxazine having the structural formula

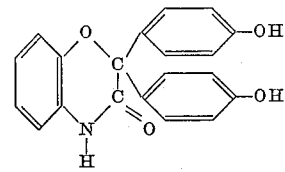

and a melting point of 284° C. were obtained in the form of a colorless crystalline substance.

EXAMPLE 3

14 gm. phenol were added to a solution of 5 gm. 2,2-dichloro-3-oxo-dihydro-1,4-benzoxazine in 30 cc. benzene, and the resulting mixture was heated to a temperature of 60 to 70° C. for one and one half hours while passing nitrogen therethrough. The reaction mixture was then allowed to cool, whereby a precipitate formed which was separated by vacuum filtration. The filter cake consisted of 6.5 gm. of a crystalline substance which was recrystallized from an 80% aqueous solution of ethanol. The pure substance was analyzed to be the same reaction product as in Example 2 with a melting point of 284° C.

The same result was obtained when the above procedure was repeated but 50 mgm. zinc chloride were added to the reaction mixture as a catalyst. However, the reaction went to completion after only 45 minutes instead of one and one half hours.

EXAMPLE 4

A mixture consisting of 5 gm. 2,2-dichloro-3-oxo-dihydro-1,4-benzoxazine, 13 gm. phenylacetate and 50 mgm. zinc chloride was heated in a round-bottom flask for 2 hours at 70 to 80° C. Thereafter, the reaction mixture was allowed to cool and the resulting mass was triturated several times with petroleum ether. The residue was recrystallized from ethanol, yielding 3 gm. of a colorless crystalline substance having a melting point of 190° C., which was analyzed to be 2,2-bis-[4′-acetoxy-phenyl]-3-oxo-dihydro-1,4-benzoxazine of the formula

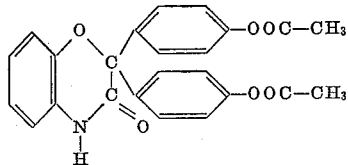

The same compound was obtained when 8 gm. 2,2-bis-[4′-hydroxy-phenyl]-3-oxo-dihydro-1,4-benzoxazine together with 50 cc. acetic acid anhydride and 16 gm. sodium acetate were heated for 3 hours on a boiling water bath. The yield was 8 gm.

EXAMPLE 5

2.5 gm. 6-methyl-2,2-dichloro-3-oxo-dihydro-1,4-benzoxazine and 4 gm. phenol were heated for 3 hours at about 80° C. The solid reaction product obtained thereby was triturated with ether and the residue was recrystallized from isopropanol. 2.5 gm. of a colorless crystalline substance melting at 293-294° C. were obtained, which was analyzed to be 6-methyl-2,2-bis-[4'-hydroxyphenyl]-3-oxo-dihydro-1,4-benzoxazine having the structural formula

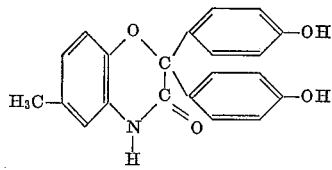

EXAMPLE 6

A mixture consisting of 5 gm. 2,2-dichloro-3-oxo-dihydro-1,4-benzoxazine and 16 gm. o-cresol was heated on a water bath for 3 hours at 70 to 80° C. Thereafter, the reaction mixture was subjected to steam distillation to remove the excess o-cresol. The distillation residue solidified and, for purification purposes, was dissolved in hot 80% aqueous isopropanol. After some standing, crystals separated out of the solution which were separated by vacuum filtration and recrystallized again from aqueous ethanol. 5.5 gm. of a colorless crystalline substance melting at 246° C. were obtained. The product was analyzed to be 2,2-bis-[4'-hydroxy-3-methyl-phenyl]-3-oxo-dihydro-1,4-benzoxazine having the structural formula

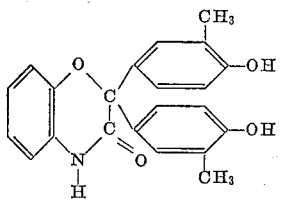

EXAMPLE 7

A mixture of 5 gm. 2,2-dichloro-3-oxo-dihydro-1,4-benzoxazine and 12 gm. guaiacol was heated for 5 hours at 70 to 80° C. Thereafter, the excess guaiacol was removed from the reaction mass by steam distillation and the residue was recrystallized from ethanol. 5.5 gm. of a colorless crystalline substance melting at 137° C. were obtained. The product was analyzed to be 2,2-bis-[4'-hydroxy - 3' - methoxy - phenyl]-3-oxo-dihydro-1,4-benzoxazine having the structural formula

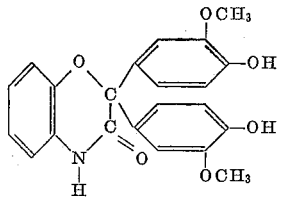

EXAMPLE 8

A mixture consisting of 5 gm. 2,2-dichloro-3-oxo-dihydro-1,4-benzoxazine and 23 gm. m-cresol was placed into a round-bottom flask and heated therein for 3 hours at 80 to 90° C. Thereafter, the reaction mixture was washed several times with water and subjected to steam distillation to remove the excess m-cresol. The residue was then stirred with cold benzene to dissolve out the resinous components of the mixture. The mixture was vacuum filtered and the filter cake was recrystallized from dilute aqueous ethanol. 3 gm. of a crystalline substance melting at 252 to 254° C. were obtained, which was found to be 2,2-bis-[4'-hydroxy-2'-methyl-phenyl]-3-oxo-dihydro-1,4-benzoxazine having the structural formula

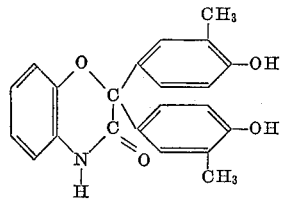

EXAMPLE 9

23 gm. phosphorus pentachloride were added to a suspension of 16.3 gm. 2,3-dioxo-dihydro-1,4-benzoxazine in 100 cc. benzene while stirring and excluding moisture. The resulting mixture was heated for two hours at 40 to 50° C. and then for a short time at 80° C. A clear solution was formed into which 38 gm. phenol were introduced, and the reaction mixture was heated for 3 hours at 70 to 80° C., accompanied by stirring. A crystalline substance separated out. The reaction mass was allowed to cool and was then vacuum filtered. The filter cake was recrystallized from a mixture of ethanol and water, yielding 9 gm. of 2,2-bis-[4'-hydroxy-phenyl]-3-oxo-dihydro-1,4-benzoxazine of the formula shown in Example 2.

EXAMPLE 10

A mixture consisting of 5 gm. 2,2-dichloro-3-oxo-dihydro-1,4-benzoxazine, 15 gm. anisole and 0.5 gm. zinc chloride was heated in 30 cc. dry benzene for 20 hours at 80 to 85° C., accompanied by stirring. Thereafter, the reaction mixture was allowed to cool and was filtered, the filtrate was admixed with an equal volume of ether and the resulting solution was shaken several times with water. The organic phase was separated, dried over sodium sulfate and the solvent was driven off in vacuo. The residue was triturated several times with petroleum ether, whereby it solidified. The solid product was allowed to stand for some time in ether and was then separated by vacuum filtration. The filter cake consisted of 4 gm. of 2,2-bis-[p-methoxy-phenyl]-3-oxo-dihydro-1,4-benzoxazine having a melting point of 153 to 155° C. and the structural formula

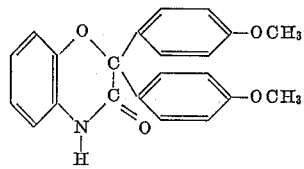

EXAMPLE 11

A mixture consisting of 2 gm. p-anisilic acid of the formula

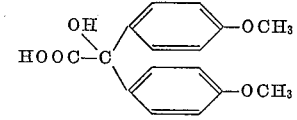

and 0.5 gm. o-aminophenol was heated on an oil bath for 3 hours at 180° C. The reaction mixture was allowed to cool and was then stirred several times with warm dilute hydrochloric acid and finally with water. The solid residue was extracted several times with ether, the ether extracts were combined and concentrated by evaporation until crystallization began. Upon standing at room temperature, 0.5 gm. of a crystalline substance separated out which was recrystallized from dilute alcohol and then had a melting point of 155° C. The product was identified as 2,2-bis-[p-methoxy-phenyl]-3-oxo-dihydro-1,4-benzoxazine having the structural formula shown in Example 10.

EXAMPLE 12

A mixture consisting of 1.5 gm. p-anisilic acid, 1 gm. o-aminophenol and 0.5 gm. zinc chloride was heated for 1 hour at 150 to 160° C. on an oil bath. The reaction mass was worked up as described in Example 11 and yielded 0.4 gm. of 2,2-bis-[p-methoxy-phenyl]-3-oxo-dihydro-1,4-benzoxazine having a melting point of 154° C.

The same result was obtained when the same amount of aluminum chloride was used instead of zinc chloride.

EXAMPLE 13

A mixture of 3 gm. p-anisilic acid, 3 gm. o-aminophenol, 0.5 gm. p-toluene-sulfonic acid and 50 cc. o-dichlorobenzene was heated for 4 hours at 180 to 190° C. on an oil bath in a vessel provided with a reflux cooler. The reaction mixture was allowed to cool, filtered on a vacuum filter, the filtrate was evaporated to dryness, and the residue was stirred a few times with warm dilute hydrochloric acid and finally with water. The residual raw product was recrystallized from dilute ethanol, yielding 1.5 gm. of a crystalline substance having a melting point of 157° C. It was identified to be 2,2-bis-(p-methoxy-phenyl)-3-oxo-dihydro-1,4-benzoxazine having the structural formula shown in Example 10.

The same result was obtained when tetralin was used as the solvent in place of o-dichlorobenzene and when benzene sulfonic acid was used as the cyclizing agent instead of p-toluene-sulfonic acid.

EXAMPLE 14

3 gm. p-anisilic acid methyl ester of the formula

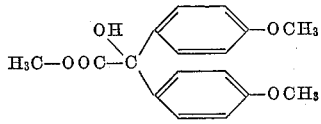

3 gm. o-aminophenol and 0.5 gm. p-toluene-sulfonic acid were admixed with 50 cc. o-dichlorobenzene, and the resulting mixture was heated for 4 hours at 180 to 190° C. on a water bath in a vessel provided with a reflux cooler. The reaction mixture was allowed to cool, filtered on a vacuum filter and worked up as described in Example 13. 0.8 gm. 2,2-bis-(p-methoxy-phenyl)-3-oxo-dihydro-1,4-benzoxazine having a melting point of 154 to 156° C. was obtained.

EXAMPLE 15

A mixture consisting of 2 gm. p-anisilic acid, 2 gm. 1-hydroxy-2-amino-4-methyl-benzene, 0.3 gm. benzenesulfonic acid and 35 cc. o-dichloro-benzene was heated and then worked up under the conditions described in Example 13. 0.9 gm. of 2,2-bis-(p-methoxy-phenyl)-3-oxo-6-methyl-dihydro-1,4-benzoxazine having the structural formula

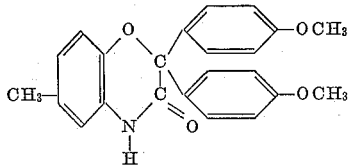

and a melting point of 230 to 231° C. was obtained.

EXAMPLE 16

(a) 5 gm. p-anisilic acid and 7.9 gm. phosphorus pentachloride were admixed in a round-bottom flask, whereby the mixture became liquid after a short period of time. Thereafter, the contents of the flask were heated for 1 hour on a water bath at about 40° C. bath temperature. The phosphorus oxychloride formed by the reaction was then distilled off in vacuo. The residue was dissolved in benzene, the solution was filtered and the solvent was driven off from the filtrate. 5 gm. of raw α-chloro-α,α-bis-(p-methoxy-phenyl)-acetic acid chloride of the formula

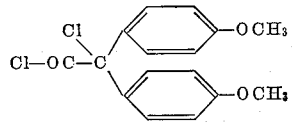

were thus obtained, which was sufficiently pure for use in the subsequent stage of the synthesis. However, upon distillation a colorless liquid was obtained which had a boiling point of 70° C. at 0.03 mm. Hg. It solidified upon standing, and then had a melting point of 23 to 26° C.

*Anaylsis.*—Calculated: C=59.08%; H=4.31%; Cl=21.84%. Found: C=58.40%; H=4.51%; Cl=21.6%.

The same result was obtained when 20 cc. thionyl chloride were used in the reaction in place of 7.9 gm. phosphorus pentachloride.

(b) 5.6 gm. of raw α-chloro-α,α-bis-(p-methoxy-phenyl)-acetic acid chloride were dissolved in 20 cc. anhydrous acetone and this solution was added dropwise, while stirring, to a mixture of 1.9 gm. o-aminophenol and 3.5 gm. sodium bicarbonate in 25 cc. acetone. After all of the solution had been added the resulting mixture was stirred for about one more hour at about 40° C. The reaction mixture was then filtered and the filtrate was introduced into water, whereby the raw reaction product precipitated out and soon thereafter became solid. It was recrystallized from 70% aqueous ethanol, yielding 4.2 gm. α,α-bis-(p-methoxy-phenyl)-glycollic acid-o-hydroxy-anilide having the structural formula

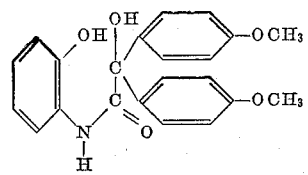

and a melting point of 204 to 205° C.

*Analysis.*—Calculated: C=69.65%; H=5.54%; N=3.69%. Found: C=69.7%; H=5.73%; N=3.60%.

(c) 9 cc. concentrated sulfuric acid were added dropwise to a mixture of 3 gm. α,α-bis-(p-methoxy-phenyl)-glycollic acid-o-hydroxy-anilide and 9 cc. glacial acetic acid, while cooling and stirring, and the resulting mixture was allowed to stand for 24 hours. Thereafter, it was poured into ice water, whereby a colorless precipitate was formed which was separated by vacuum filtration, dried and taken up in ether. The residue remaining after evaporating the ether was recrystallized from dilute ethanol, yielding 2 gm. of a colorless crystalline substance having a melting point of 154° C. It was identified to be 2,2-bis-(p-methoxy-phenyl)-3-oxo-dihydro-1,4-benzoxazine having the structural formula shown in Example 10.

The same result was obtained when 80% sulfuric acid was used instead of concentrated sulfuric acid.

(d) A mixture of 1 gm. 2,2-bis-(p-methoxy-phenyl)-3-oxo-dihydro-1,4-benzoxazine and 5 gm. pyridine hydrochloride was heated at 180° C. on an oil bath for 4 hours. Thereafter, the reaction mixture was allowed to cool and was then poured into water, whereby 2,2-bis-(p-hydroxyphenyl)-3-oxo-dihydro-1,4-benzoxazine precipitated out. This precipitate was admixed with 5 cc. acetic acid anhydride and 0.3 gm. sodium acetate and the mixture was heated for 2 hours on a boiling water bath. Thereafter, water was added to the reaction mixture, causing a precipitate to form which was separated by vacuum filtration, washed with water and recrystallized from ethanol. The product thus obtained had a melting point of 190° C. and was identified to be 2,2-bis-(p-acetoxy-phenyl)-3-oxo-dihydro-1,4-benzoxazine having the structural formula shown in Example 4.

EXAMPLE 17

(a) 5.6 gm. raw α-chloro-α,α-bis-(p-methoxy-phenyl)-acetic acid chloride, prepared by the method described in Example 16a, were dissolved in 25 cc. anhydrous benzene, the resulting solution was filtered and the filtrate was added dropwise to a suspension of 3.8 gm. o-aminophenol in 30 cc. benzene while stirring. After stirring the resulting mixture for an additional hour the precipitate which formed was filtered off on a vacuum filter and the filtrate was shaken first with water, then with dilute hydrochloric acid and again with water. The benzene solution thus obtained was filtered and allowed to stand overnight. A crystalline precipitate formed which was separated and recrystallized from 70% ethanol. 1.5 gm. of α,α-bis-(p-methoxy-phenyl)-glycollic acid-o-hydroxy-anilide having a melting point of 204 to 205° C. and the structural formula shown in Example 16b were obtained.

(b) A mixture of 3.8 gm. α,α-bis-(p-methoxy-phenyl)-glycollic acid-o-hydroxy-anilide, 50 cc. o-dichlorobenzene and 0.4 gm. p-toluene-sulfonic acid was heated for 10 minutes at 130 to 180° C. in a vessel provided with a reflux cooler. The reaction mixture was then filtered and the filtrate was freed from solvent by evaporation. The residue was taken up in ether, the resulting solution was filtered and the filtrate was evaporated. The residue was recrystallized from dilute ethanol, yielding 2.5 gm. of 2,2-bis-(p-methoxy-phenyl)-3-oxo-dihydro - 1,4 - benzoxazine having a melting point of 153 to 154° C. and the structural formula shown in Example 10.

The same results were obtained when cumene or tetralin were used as the solvent instead of o-dichlorobenzene, and when benzene-sulfonic acid or napthalene-sulfonic acid or their chlorides were used as the cyclizing agent instead of p-toluene-sulfonic acid.

EXAMPLE 18

(a) The procedure described in Example 16b was repeated, but 2.1 gm. 1-hydroxy-2-amino-4-methyl-benzene were used in place of the o-aminophenol. 3.8 gm. α,α-bis-(p-methoxy-phenyl)-glycollic acid-(5-methyl-2-hydroxy-anilide) having the structural formula

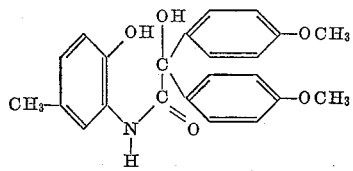

and a melting point of 167 to 169° C. were obtained.

*Analysis.*—Calculated: C=70.23%; H=5.85%; N=3.56%. Found: C=70.50%; H=6.10%; N=3.55%.

(b) 1 gm. of the compound obtained under (a) above was admixed with 1 gm. aluminum chloride and the mixture was heated for one hour at 100° C. After allowing it to cool, the reaction mixture was extracted several times with ether, the extract solutions were combined and the solvent was evaporated. The residue was recrystallized from ethanol, yielding 0.8 gm. of 2,2-bis-(p-methoxy-phenyl)-3-oxo-6-methyl-dihydro-1,4-benzoxazine having a melting point of 229 to 230° C.

EXAMPLE 19

(a) A Grignard reagent was prepared from 9.6 gm. magnesium powder and 74.8 gm. p-bromo-anisole in about 250 cc. of a mixture of benzene and tetrahydrofuran (1:1). To the resulting solution of p-(bromomagnesium)-anisole 16.3 gm. 2,3-dioxo-dihydro-1,4-benzoxazine were added in small portions while stirring, and then the mixture formed thereby was heated for 2 hours at 50 to 55° C. Thereafter, the reaction mixture was caused to divide into an aqueous and an organic phase by adding ice and dilute acetic acid. The organic phase was separated. After a short time of standing a virtually colorless precipitate crystallized out of the organic phase, which was recrystallized from acetone. 28 gm. of α,α-bis-(p-methoxy-phenyl)-glycollic acid-o-hydroxy-anilide having a melting point of 205° C. and a structural formula shown in Example 16b were obtained. This compound was then treated with concentrated sulfuric acid as described in Example 16c to effect ring closure, yielding 2,2-bis-(p-methoxy-phenyl)-3-oxo-dihydro-1,4-benzoxazine.

(b) 50 gm. oxalic acid ethyl ester chloride were added dropwise to a solution of 40 gm. o-aminophenol in 500 cc. benzene while stirring, and the resulting mixture was heated for 15 minutes at 60° C. It was then allowed to cool, the precipitate formed thereby was separated by vacuum filtration, and the filter cake was washed with benzene and recrystallized from ethanol. 55 gm. of a colorless crystalline substance were obtained which decomposed at 185° C. It was identified to be (o-hydroxy-phenyl)-oxamic acid ethyl ester of the formula

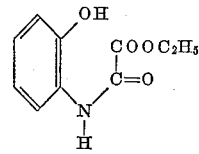

A Grignard reagent was prepared from 7.2 gm. powdered magnesium and 56.1 gm. p-bromo-anisole in anhydrous ether. The resulting solution of p-(bromo-magnesium)-anisole was admixed with 10.5 gm. (o-hydroxy-phenyl)-oxamic acid ethyl ester while stirring and cooling. The reaction mixture was then refluxed for 2 hours, and at the end of this period it was decomposed into an organic and an aqueous phase by adding ice and acetic acid. The ether phase was separated, washed with water and the ether was evaporated. A crystalline substance was obtained which was recrystallized from acetone. 10 gm. of α,α-(p-methoxy-phenyl)-glycollic acid-o-hydroxy anilide having a melting point of 205 to 206° C. and the structural formula shown in Example 16b were obtained.

The same compound was obtained when (o-hydroxy-phenyl)-oxamic acid methyl ester, which decomposes between 170 and 180° C., was used instead of (o-hydroxy-phenyl)-oxamic acid ethyl ester in the above procedure.

The glycollic acid anilide obtained in this manner was then treated with concentrated sulfuric acid as described in Example 16c, yielding 2,2-bis-(p-methoxy-phenyl)-3-oxo-dihydro-1,4-benzoxazine.

EXAMPLE 20

(a) 1 gm. α,α-bis-(p-methoxy-phenyl)-glycollic acid-o-hydroxy-anilide was intimately admixed with 2 gm. phosphorus pentoxide and the resulting mixture was heated at 100° C. for 1½ hours on an oil bath. Thereafter, it was allowed to cool and was triturated several times with ether. The ether extract solutions were combined, the ether was evaporated, and the residue was recrystallized from dilute ethanol. 0.8 gm. of a crystalline substance having a melting point of 155 to 156° C. was obtained. It was identified to be 2,2-bis-(p-methoxy-phenyl)-3-oxo-dihydro-1,4-benzoxazine having the structural formula shown in Example 10.

The same result was obtained when 1 gm. aluminum chloride or 1 gm. zinc chloride was used in place of 2 gm. phosphorus pentoxide.

(b) The compound thus obtained was then converted into 2,2-bis-(p-hydroxy-phenyl)-3-oxo-dihydro-1,4-benzoxazine by the method described in Example 16d.

EXAMPLE 21

A solution of 1 gm. α,α-bis-(p-methoxy-phenyl)-glycollic acid-o-hydroxy-anilide in 10 cc. carbon tetrachloride was admixed with 10 cc. thionyl chloride and the resulting mixture was refluxed for 45 minutes. The reaction mixture was then evaporated to dryness in vacuo and the residue was taken up in ether. The ether was evaporated from the resulting solution, leaving 0.5 gm. of raw 2,2 - bis - (p - methoxy - phenyl) - 3 - oxo - dihydro-1,4-benzoxazine which, after recrystallization from dilute ethanol, had a melting point of 154° C. The same result was obtained when 3 cc. phosphorus oxychloride was used in place of 10 cc. thionyl chloride.

EXAMPLE 22

(a) A Grignard reagent was prepared from 1.6 gm. magnesium powder and 12.7 gm. p-bromo-anisole in anhydrous ether. The resulting anhydrous ether solution of p-(bromo-magnesium)-anisole was admixed with 3 gm. 6 - methyl - 2,3 - dioxo - dihydro - 1,4 - benzoxazine in small portions and the mixture was refluxed for 2 hours. Thereafter, the reaction mixture was decomposed into an ether phase and an aqueous phase by adding dilute acetic acid. The ether phase was separated from the aqueous phase, the ether was evaporated and the evaporation residue was subjected to steam distillation. The solid residue from the steam distillation was recrystallized from ethanol, yielding 3 gm. of α,α-bis-(p-methoxy-phenyl) - glycollic acid - (2 - hydroxy - 5 - methyl)-anilide having a melting point of 171° C. and the structural formula shown in Example 18a.

The compound thus obtained was then subjected to a ring closure reaction with aluminum chloride as described in Example 18b, yielding 2,2-bis-(-p-methoxy-phenyl)-3-oxo-6-methyl-dihydro-benzoxazine.

(b) 25 gm. oxalic acid ethyl ester chloride were added dropwise to a solution of 22.6 gm. 1-hydroxy-2-amino-4-methyl-benzene in 200 cc. benzene, while stirring. The resulting mixture was then heated at 60° C. for 15 minutes. The reaction mixture was allowed to cool and the crystalline slurry formed thereby was filtered on a vacuum filter. The filter cake was washed with benzene and was then recrystallized from ethanol, yielding 29 gm. of (2-hydroxy-5-methyl-phenyl)-oxamic acid ethyl ester having a melting point of 184 to 185° C. and the structural formula

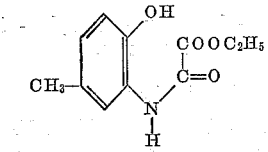

A Grignard reagent was prepared from 7.2 gm. magnesium powder and 56.1 gm. p-bromo-anisole in 150 cc. of a mixture of benzene and tetrahydrofuran (1:1). The resulting solution of p-(bromo-magnesium)-anisole was then added dropwise, while stirring, to a suspension of 12 gm. (2-hydroxy-5-methyl-phenyl)-oxamic acid ethyl ester in 150 cc. of a mixture of benzene and tetrahydrofuran (1:1), and the mixture was heated for two hours at 60° C. After allowing it to cool, the reaction mixture was decomposed into a benzene phase and an aqueous phase by adding ice and a 50% aqueous solution of acetic acid. The benzene phase was separated, washed with water until neutral, dried over sodium sulfate, the benzene was distilled off and the residue, which crystallized rapidly, was recrystallized from dilute ethanol. 15 gm. of α,α - bis - (p - methoxy - phenyl) - glycollic acid-(2-hydroxy-5-methyl)-anilide having a melting point of 171° C. and the structural formula shown under (a) above were obtained.

This compound was then subjected to a ring closure reaction with aluminum chloride, as described in Example 18b, yielding 2,2-bis-(p-methoxy-phenyl)-3-oxo-6-methyl-dihydro-1,4-benzoxazine.

The compounds embraced by formula I above exhibit excellent laxative properties, coupled with good stomach compatibility, absence of undesirable side effects, such as tenseness, and a very low toxicity, as determined by tests on rats as well as adult humans.

For example, the effective laxative dose ($ED_{50}$) of 2,2-bis-(4'-hydroxy-phenyl) - 3 - dihydro - 1,4 - benzoxazine in rats by peroral administration in 50 mgm./kg. The laxative activity of the compound is therefore more than three times as great as that of phenolphthalein, the $ED_{50}$ of which in rats per os is reported to be 160 mgm./kg. by Schmidt in Archiv der Experimentellen Pathologie und Pharmakologie, vol. 226, page 208 (1955). The individual effective laxative dose of 2,2-bis-(4'-hydroxy-phenyl)-3-oxo-dihydro-1,4-benzoxazine in adult humans, per os, is from 75 to 125 mgm. Its toxicity ($LD_{50}$) in rats, per os, is above 8 gm./kg.

The individual effective laxative dose of 2,2-bis-(p-acetoxy-phenyl)-3-oxo-dihydro-1,4-benzoxazine in adult humans, per os, is from 100 to 150 mgm.

The compounds in accordance with the present invention may be administered in dosage form by means of diverse compositions, such as tablets, sugar-coated pills, chocolate wafers, granulated powders, aqueous suspensions, suppositories or the like.

The following examples will illustrate various compositions adapted for internal administration of the compounds embraced by Formula I above in dosage form.

EXAMPLE 23

Tables: Mgm.
2,2-bis-(p-acetoxy-phenyl)-3-oxo - dihydro - 1,4-benzoxazine _____ 100
Powdered lactose _____ 50
Potato starch (dry) _____ 65
Gelatin _____ 4
Magnesium stearate _____ 1

Total weight _____ 220

The benzoxazine compound, the lactose and the dry potato starch are first admixed with each other. The resulting mixture is then kneaded with a 10% aqueous gelatin solution. Thereafter, the kneaded, moist mass is granulated by passing it through a sieve having a 1.5 mm. mesh and is then dried at 45° C. The dry granulate is admixed with the magnesium stearate and the potato starch. The finished mixture is then pressed into tablets having a total weight of 220 mgm. and a diameter of about 9 mm.

EXAMPLE 24

Sugar-coated pills

The tablets produced in accordance with Example 23 are provided with a thin shellac shell and are then coated with sugar syrup.

EXAMPLE 25

Chocolate wafers:
2,2-bis-(p-acetoxy-phenyl)-3-oxo - dihydro - 1,4-benzoxazine _____ mgm__ 150
Chocolate _____ gm__ 3

The chocolate is first melted and then the benzoxazine compound is added in finely powdered form to the melted chocolate. The mixture is thoroughly blended and is then poured into molds and cooled. The molds are suitably constructed so as to produce individual units of 3.0 gm. of the laxative chocolate composition.

EXAMPLE 26

Granulate: Gm.
I. 2,2-bis-(p-acetoxy-phenyl) -3- oxo - dihydro-1,4-benzoxazine _____ 1.5
Powdered sugar _____ 24.0
Potato starch _____ 2.0
Fatty acid triglyceride _____ 0.8
Sugar syrup _____ 4.7
Ethanol _____ 3.0
Dyes and flavorings _____ as needed Total weight about _____ 36.0

EXAMPLE 26—Continued

Granulate:

| | Gm. |
|---|---|
| II. Carbowax | 0.5 |
| Shellac | 0.3 |
| Stearic acid | 0.05 |
| Castor oil | 0.02 |
| Ethanol | 3.13 |
| Total weight | 4.0 |

(1) The fatty acid triglyceride is dissolved in the ethanol and the resulting solution is admixed with the sugar syrup containing the dyes and flavorings, if desired.

(2) The remaining materials under I are admixed with each other and the resulting mixture is moistened with the mixture obtained under (1). The moist mixture is then granulated by passing it through a screen having a mesh of 1.5 mm. and is dried. The powdery components are screened off.

(3) The granulate thus obtained is coated with a mixture of the ingredients listed under II above.

EXAMPLE 27

Aqueous suspension:

| | Gm. |
|---|---|
| Finely milled 2,2-bis-(p-acetoxy-phenyl)-3-oxo-dihydro-1,4-benzoxazine | 2.00 |
| Preservatives | 0.14 |
| Citric acid | 0.10 |
| Sodium acid phosphate | 0.15 |
| Glycerin | 10.00 |
| Carboxymethyl cellulose | 0.50 |
| Sugar | 25.00 |
| Aerosil | 1.40 |
| Distilled water | 60.65 |
| Flavoring | as needed |
| Total weight | 100.00 |

The preservatives are dissolved in water at about 80° C. After cooling to about 40° C., the solution is admixed with the glycerin, the citric acid and the sodium acid phosphate in that order. Thus, the carboxymethyl cellulose, the aerosil and the benzoxazine compound are stirred in and the flavoring is added. After 2 to 3 hours of standing the resulting suspension is homogenized.

EXAMPLE 28

Suppositories:

| | | |
|---|---|---|
| 2,2-bis-(p-acetoxy-phenyl)-3-oxo-dihydro-1,4-benzoxazine | mgm | 100 |
| Cocoa butter, q.s.ad | gm | 2 |

The cocoa butter is melted, the benzoxazine compound is stirred into the molten mass and the resulting mixture is poured into a suitable mold and allowed to cool.

It is obvious that the 2,2-bis-(p-acetoxy-phenyl)-3-oxo-dihydro-1,4-benzoxazine is used merely as an illustrative active ingredient in Examples 23 through 28 and may be replaced by any of the other benzoxazine compounds embraced by Formula I.

While I have illustrated the present invention with the aid of certain specific embodiments thereof, it will be apparent to those skilled in the art that the invention is not limited to those embodiments and that various changes and modifications may be made without departing from the spirit of the invention or the scope of the appended claims.

I claim:

1. Compounds having the structural formula

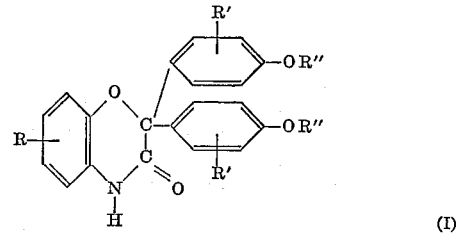

(I)

wherein

R is selected from the group consisting of hydrogen and lower alkyl,

R' is selected from the group consisting of hydrogen, lower alkyl and lower alkoxy, and R" is selected from the group consisting of hydrogen, lower alkanoyl and lower alkyl.

2. 2,2 - bis - (p - hydroxy - phenyl) - 3 - oxo - dihydro-1,4 - benzoxazine.

3. 2,2 - bis - (p - acetoxy - phenyl) - 3 - oxo - dihydro-1,4 - benzoxazine.

4. 2,2 - bis - (p - methoxy - phenyl) - 3 - oxo - dihydro-1,4 - benzoxazine.

5. 2,2 - bis - (p - hydroxy - phenyl) - 3 - oxo - 6-methyl - dihydro - 1,4 - benzoxazine.

References Cited in the file of this patent

UNITED STATES PATENTS

| 1,951,807 | Preiswerk et al. | Mar. 20, 1934 |
| 2,776,281 | Wright | Jan. 1, 1957 |
| 2,943,087 | Ohnacker et al. | June 28, 1960 |

UNITED STATES PATENT OFFICE
CERTIFICATION OF CORRECTION

Patent No. 3,006,917            October 31, 1961

Ernst Seeger

It is hereby certified that error appears in the above numbered patent requiring correction and that the said Letters Patent should read as corrected below.

Column 2, line 31, for "raction" read -- reaction --; column 3, line 28, for "reaction" read -- reacting --; lines 47 to 56, formula (VIII) should appear as shown below instead of as in the patent:

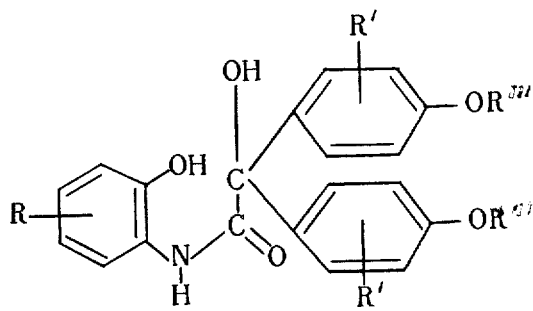

column 5, line 40, for "R''" read -- R''' --; column 8, lines 4 to 12, the formula should appear as shown below instead of as in the patent:

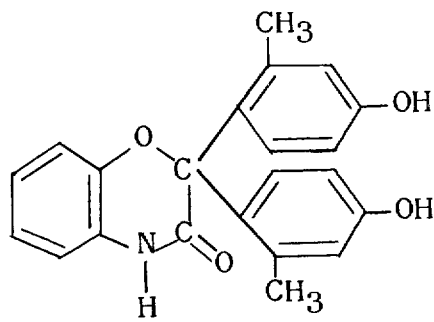

column 14, line 2, for "-3-dihydro-" read -- 3-oxo-dihydro- --; line 26, for "Tables" read -- Tablets --.

Signed and sealed this 8th day of May 1962.

(SEAL)
Attest:

ERNEST W. SWIDER
Attesting Officer

DAVID L. LADD
Commissioner of Patents